(12) United States Patent
Otsuki et al.

(10) Patent No.: US 9,168,602 B2
(45) Date of Patent: Oct. 27, 2015

(54) GEAR GRINDING MACHINE AND GEAR GRINDING METHOD

(75) Inventors: Naohiro Otsuki, Tokyo (JP); Koichi Masuo, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 352 days.

(21) Appl. No.: 13/637,866

(22) PCT Filed: Jul. 7, 2011

(86) PCT No.: PCT/JP2011/065533
§ 371 (c)(1),
(2), (4) Date: Nov. 29, 2012

(87) PCT Pub. No.: WO2012/011392
PCT Pub. Date: Jan. 26, 2012

(65) Prior Publication Data
US 2013/0143471 A1  Jun. 6, 2013

(30) Foreign Application Priority Data
Jul. 20, 2010 (JP) .................. 2010-162428

(51) Int. Cl.
*B24B 49/10* (2006.01)
*B23F 9/02* (2006.01)
*B23F 1/02* (2006.01)
*B23F 23/00* (2006.01)

(52) U.S. Cl.
CPC ... *B23F 9/02* (2013.01); *B23F 1/02* (2013.01); *B23F 23/006* (2013.01)

(58) Field of Classification Search
CPC ............... B23F 9/02; B23F 5/20; B23F 1/02; B23F 23/006; B24B 49/00
USPC .......................................... 451/47, 5, 8, 9, 10
See application file for complete search history.

(56) References Cited

U.S. PATENT DOCUMENTS

| 5,539,172 A | 7/1996 | Takase et al. |
| 5,765,974 A | 6/1998 | Faulstich |
| 5,882,154 A | 3/1999 | Mihara et al. |

(Continued)

FOREIGN PATENT DOCUMENTS

| JP | 6-315825 A | 11/1994 |
| JP | 2003-191131 A | 7/2003 |

(Continued)

OTHER PUBLICATIONS

Taiwanese Office Action and partial English translation thereof, dated Oct. 17, 2013, for Patent Application No. 100125302.

*Primary Examiner* — Robert Rose
(74) *Attorney, Agent, or Firm* — Birch, Stewart, Kolasch & Birch, LLP (57) ABSTRACT

The actual axial center position of a helical gear relative to the axial center position of a rotary table is calculated on the basis of input gear dimensions and information from a touch probe. Correction values for the positions and motions of the rotary table and a grindstone are calculated on the basis of the actual axial center position of the helical gear. Operation values for the rotary table, a column, a saddle, and a grindstone head are calculated by adding the correction values to reference values for the positions and motions of the rotary table and the grindstone. Motors are controlled in such a way that operation is carried out at the operation values to thereby carry out form grinding.

1 Claim, 8 Drawing Sheets

(56) References Cited

U.S. PATENT DOCUMENTS 7,402,007 B2 * 7/2008 Fahrer et al. .................... 409/51
2003/0113177 A1 6/2003 Fahrer et al.

FOREIGN PATENT DOCUMENTS

TW 405470 A 9/2000
WO 96/26804 A1 9/1996

* cited by examiner

GEAR GRINDING MACHINE AND GEAR GRINDING METHOD

TECHNICAL FIELD

The present invention relates to a gear grinding machine and a gear grinding method and is effective particularly when used to grind large-sized gears having helical tooth traces such as large-sized helical gears and crossed helical gears.

BACKGROUND ART

Gear grinding machines are configured to sequentially grind the tooth surfaces of a gear mounted on a rotary table by rotating the gear and inserting the circumference of a disk-shaped grinding wheel, which is being driven to rotate, into each tooth space of the gear. In this way, the gear's meshing accuracy can be improved. Such a gear grinding machine cannot properly grind the tooth surfaces of the gear when the axis of the gear is displaced (offset) with respect to the axis of the rotary table. Thus, the axis of the rotary table and the axis of the gear need to be accurately positioned to each other (centering). However, in a case of machining a large-sized gear measuring several meters in diameter, the centering cannot be done easily because such a gear is extremely heavy, weighing several tons.

In this respect, for example, Patent Literature 1 listed below and the like disclose the following. Specifically, a rotary table is rotated to measure the runout of a gear to thereby read, from a graph, the relation between the value of the position of the axis of the gear (eccentricity) and the phase position. As position vectors associated with the center of the rotary table, the following are calculated: the eccentricity at the center in the face width; the crossing angle between the axis of the rotary table and the axis of the gear; the eccentricity with respect to any planes perpendicular to the axis of the rotary table; and the phase angle. Then, the above adjustment data thus obtained are displaced perpendicular to the axis of the rotary table so that the axis of the rotary table and the axis of the gear can intersect at the center in the face width, for example. Then, the axis of the rotary table and the axis of the gear are tilted by the crossing angle between these two axes, followed by the moving of a tool in accordance with such speeds, positions, and paths that the guiding axis of the tool and the axis of the gear coincide, to thereby machine the gear.

CITATION LIST

Patent Literature

Patent Literature 1: Japanese Patent Application Publication No. 2003-191131

SUMMARY OF INVENTION

Technical Problem

The gear machining method described in Patent Literature 1 listed above and the like is capable of machining a spur gear having straight tooth traces along with the correction. However, there is no description regarding accurate machining of a gear having helical tooth traces such as a helical gear or a crossed helical gear. Moreover, in profile grinding of a helical gear, a crossed helical gear, or the like, the machining accuracy is affected by the position of the grinding wheel, errors in operations involving synchronization of the motion of the grinding wheel and the rotation of the gear, and other factors. For this reason, the profile grinding needs to be performed while correcting these factors, as well.

In view of the above, it is an object of the present invention to provide a gear grinding machine and a gear grinding method capable of achieving an improved machining accuracy in profile grinding of a gear with helical tooth traces using a grinding wheel for profile grinding.

Solution to Problem

A gear grinding machine according to the present invention for solving the above problems is a gear grinding machine for performing profile grinding of a gear with a disk-shaped grinding wheel, the gear having a helical tooth trace and mounted on a rotary table with an axis thereof oriented in a vertical direction, and is characterized in that the gear grinding machine comprises: rotary-table driving means for rotating the rotary table about an axis extending in the vertical direction; grinding-wheel rotating means for rotating the grinding wheel with a circumference of the grinding wheel facing the gear on the rotary table; displacement measuring means for measuring displacement of the gear on the rotary table in a direction perpendicular to a direction of the axis of the gear; X-axis direction moving means for moving the grinding wheel and the displacement measuring means in a depth direction of a tooth space of the gear on the rotary table; Y-axis direction moving means for moving the grinding wheel and the displacement measuring means in a horizontal direction perpendicular to the depth direction of the tooth space of the gear on the rotary table; Z-axis direction moving means for moving the grinding wheel and the displacement measuring means in the vertical direction; and controlling means for: actuating the rotary-table driving means and the axis direction moving means in such a way that the displacement measuring means measures a position of a circumference of the gear on the rotary table in the direction perpendicular to the direction of the axis of the gear, at a plurality of points in a circumferential direction and an axial direction of the gear, calculating an actual position of the axis of the gear with respect to a position of an axis of the rotary table on the basis of information from the displacement measuring means; calculating correction values for a position and motion of each of the rotary table and the grinding wheel on the basis of the actual position of the axis of the gear, the correction values, in the profile grinding, cancelling out differences, caused by the actual position of the axis of the gear, from reference values of a position and motion of the rotary table in the profile grinding performed in a condition where the axis of the gear coincides with the axis of the rotary table and reference values of a position and motion of the grinding wheel corresponding to a rotational phase of the rotary table in the condition; adding the correction values to the reference values to calculate operation values of the rotary-table driving means and operation values of the X-axis direction moving means, the Y-axis direction moving means, and the Z-axis direction moving means corresponding to the rotational phase of the rotary table; and controlling the rotary-table driving means, the X-axis direction moving means, the Y-axis direction moving means, and the Z-axis direction moving means in such a way as to actuate the rotary-table driving means, the X-axis direction moving means, the Y-axis direction moving means, and the Z-axis direction moving means in accordance with the operation values, to perform the profile grinding of the gear with the grinding wheel.

Further, in the gear grinding machine described above, the gear grinding machine according to the present invention is characterized in that the controlling means calculates the actual position of the axis of the gear with respect to the position of the axis of the rotary table by: calculating, on the basis of the information from the displacement measuring means, a value of eccentricity $\epsilon u$ of an upper side of the gear with respect to the position of the axis of the rotary table on a horizontal plane in a state where the rotary table is at a reference phase, and a value of eccentricity $\epsilon d$ of a lower side of the gear with respect to the position of the axis of the rotary table on the horizontal plane in the state where the rotary table is at the reference phase; and calculating, on the basis of the values of eccentricity $\epsilon u$ and $\epsilon d$, a value of eccentricity $\epsilon m$ of a center portion, in the axial direction, of the gear with respect to the position of the axis of the rotary table on the horizontal plane in the state where the rotary table is at the reference phase, and angles of inclination $\Sigma x$ and $\Sigma y$ of the axis of the gear with respect to the axis of the rotary table on vertical planes in the state where the rotary table is at the reference phase.

Furthermore, in the gear grinding machine described above, the gear grinding machine according to the present invention is characterized in that: on the basis of the value of eccentricity $\epsilon m$, the controlling means calculates correction values for a horizontal position of a profile-grinding start point, the horizontal position being influenced by offset of the axis of the gear, and correction values for a horizontal motion associated with a motion in a Z-axis direction in the profile grinding; and on the basis of the angles of inclination $\Sigma x$ and $\Sigma y$, the controlling means calculates a correction value for displacement of a position in the vertical direction caused by the inclination of the axis of the gear, correction values for displacement of a motion in the horizontal directions associated with a motion in the vertical direction in the profile grinding operation, the motion in the vertical direction being influenced by the inclination of the axis of the gear, and correction values for a motion in the horizontal directions associated with a motion in the vertical direction, the correction values correcting a tooth profile error caused by displacement of a tooth-profile grinding line of the grinding wheel on a tooth surface of the gear due to the influence of the inclination of the axis of the gear.

A gear grinding method according to the present invention for solving the problems described above is a gear grinding method for grinding a gear with a disk-shaped grinding wheel, the gear having a helical tooth trace and mounted on a rotary table with an axis thereof oriented in a vertical direction, and is characterized in that the gear grinding method comprises: calculating an actual position of the axis of the gear with respect to a position of an axis of the rotary table by measuring a position of a circumference of the gear on the rotary table in a direction perpendicular to a direction of the axis of the gear, at a plurality of points in a circumferential direction and an axial direction of the gear; calculating correction values for a position and motion of each of the rotary table and the grinding wheel on the basis of the actual position of the axis of the gear, the correction values, in the profile grinding, cancelling out differences, caused by the actual position of the axis of the gear, from reference values of a position and motion of the rotary table in a condition where the axis of the gear coincides with the axis of the rotary table and reference values of a position and motion of the grinding wheel corresponding to a rotational phase of the rotary table in the condition; adding the correction values to the reference values to calculate operation values of the position and motion of the rotary table and operation values of the position and motion of the grinding wheel corresponding to the rotational phase of the rotary table; and actuating the rotary table and the grinding wheel in accordance with the operation values to perform the profile grinding of the gear with the grinding wheel.

Advantageous Effects of Invention

In the gear grinding machine and the gear grinding method according to the present invention, when the axis of the gear is eccentric (offset) with respect to the axis of the rotary table, the coordinates of the position of the profile-grinding start point changes from one tooth space of the gear to another tooth space indexed. Accordingly, the grinding start point moves in a fluctuating manner. Thus, for each tooth space of the gear indexed, the horizontal position of the grinding wheel is corrected so as to follow the fluctuations. Moreover, the axis of the gear moves from one tooth space of the gear to another tooth space indexed, in synchronization with the phase of the rotary table. Accordingly, the profile grinding point moves in such a way as to swing (helical turn) on one and the other sides in the face width direction, i.e. on upper and lower sides. Thus, along with the motion of the grinding wheel in the vertical direction, the horizontal motion of the grinding wheel is corrected in such a way as to follow the swinging grinding point. In addition, when the axis of the gear is inclined with respect to the axis of the rotary table, the tooth-profile grinding line of the grinding wheel on the tooth surface of the gear is displaced from a reference tooth-profile grinding line. Accordingly, the contact between the grinding wheel and the tooth surface fails to be in a prescribed state. This results in an error in the tooth surface of the gear after its profile grinding. Thus, based on the angles of inclination of the axis of the gear with respect to the axis of the rotary table, the motion of the grinding wheel in the horizontal directions and the rotational motion of the rotary table are further corrected in association with the motion of the grinding wheel in the vertical direction in such a way as to cancel out the error in the tooth surface. Accordingly, it is possible to perform accurate profile grinding of a large-sized gear having helical tooth traces with a disk-shaped grinding wheel, even when the axis of the gear is displaced with respect to the axis of a rotary table.

DESCRIPTION OF EMBODIMENTS

Hereinbelow, an embodiment of a gear grinding machine and a gear grinding method according to the present invention will be described based on the drawings. However, the present invention is not limited only to the following embodiment to be described based on the drawings.

<Main Embodiment>

A main embodiment of a gear grinding machine and a gear grinding method according to the present invention will be described based on FIGS. 1 to 8.

Figure 1:
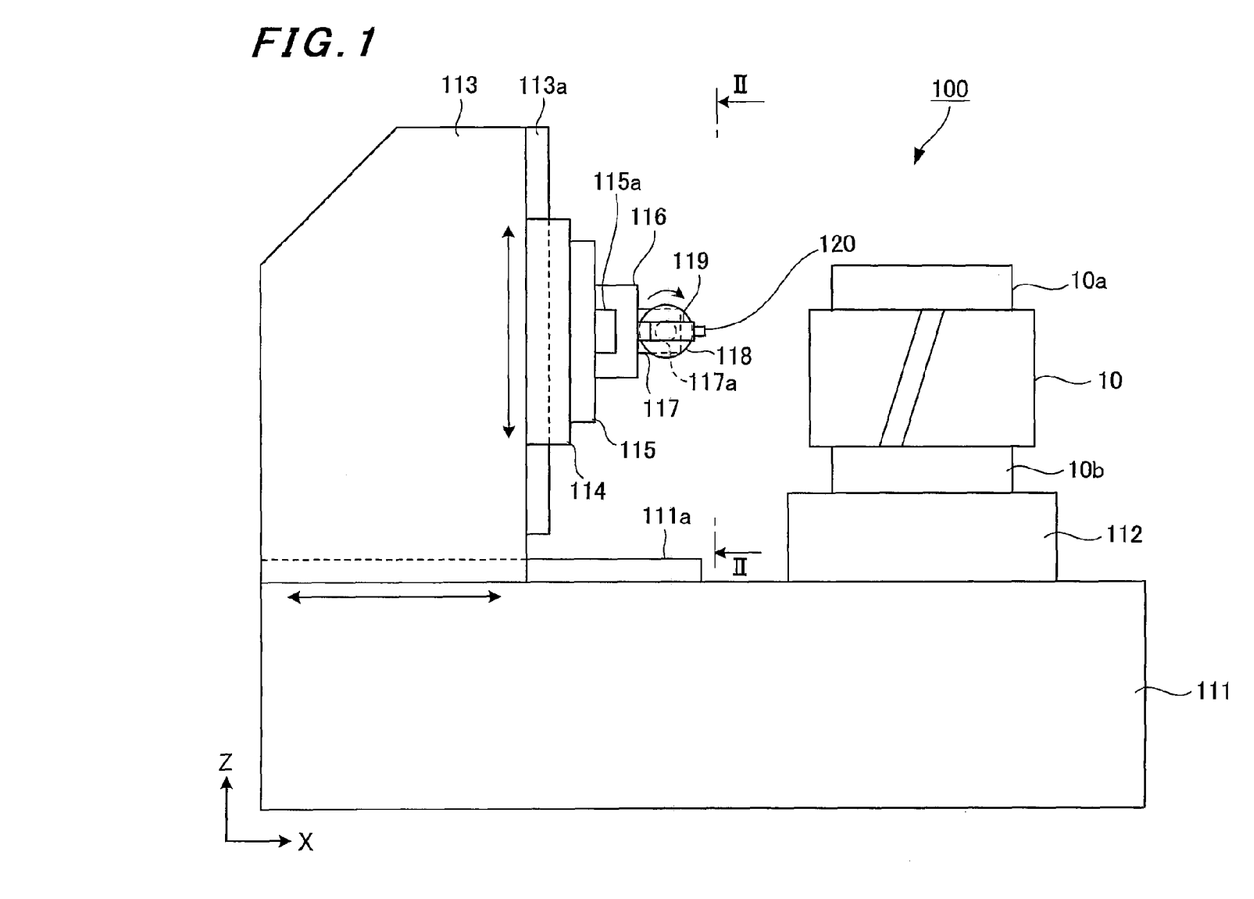
FIG. 1 is a schematic side view of a main embodiment of a gear grinding machine according to the present invention.

As shown in FIG. 1, a rotary table 112 being rotatable about the Z axis, i.e. an axis extending in the vertical direction is provided on one side, in the X-axis direction, of the top of a bed 111. On the rotary table 112, a large-sized (a diameter of several meters and a weight of several tons) helical gear 10 having bosses 10a and 10b is mounted with its axis being oriented in the Z-axis direction, i.e. the vertical direction.

Figure 2:
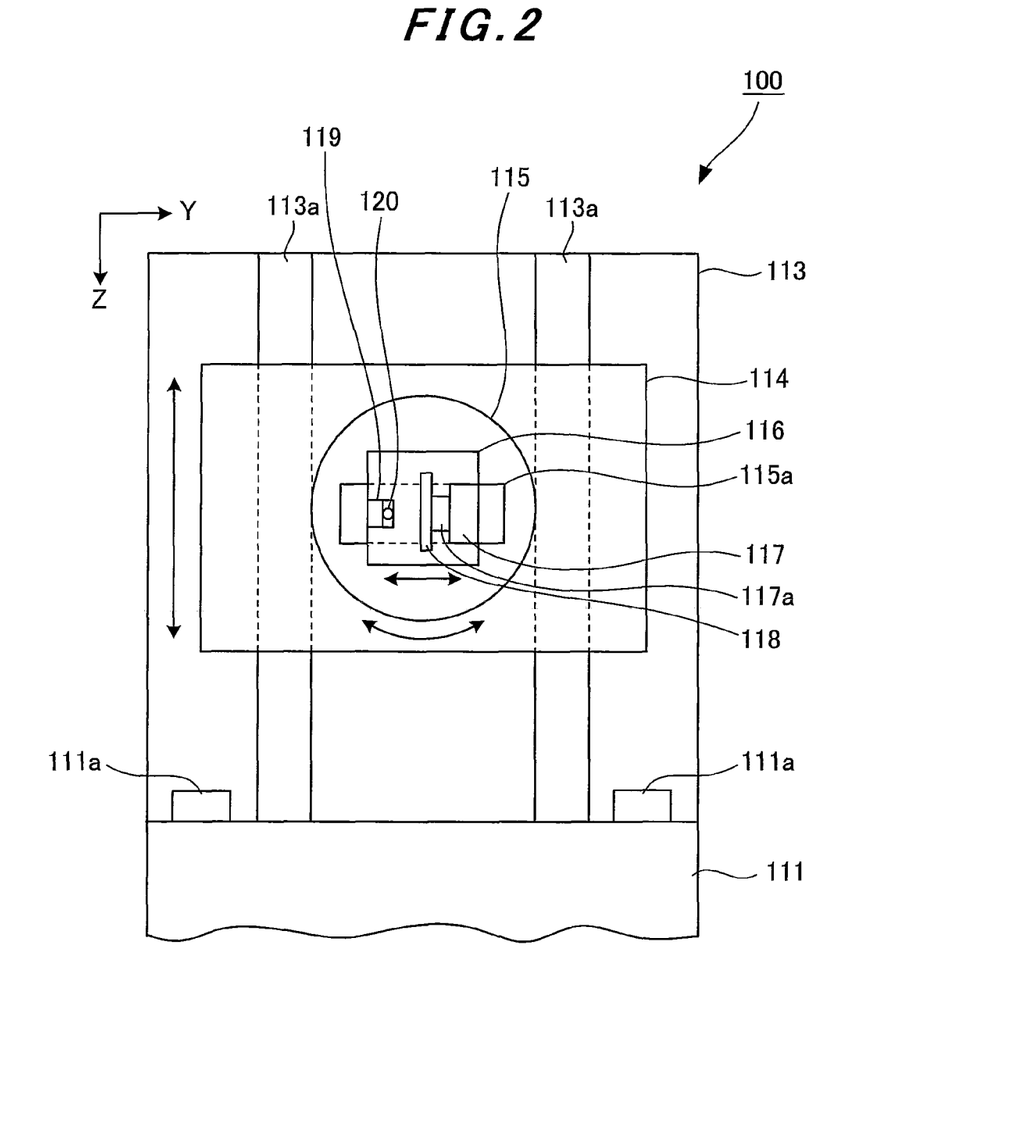
FIG. 2 is a front view seen from the position of a II-II line in FIG. 1.

As shown in FIGS. 1 and 2, a column 113 being movable in the X-axis direction, i.e. the depth direction of a tooth space of the helical gear 10 on the rotary table 112 is provided on the other side, in the X-axis direction, of the top of the bed 111 with rails 111a therebetween. A saddle 114 being movable in the Z-axis direction, i.e. the vertical direction is provided on the front face (the face on the rotary table 112 side) of the column 113 with rails 113a therebetween. A turn head 115 being turnable about the X axis is provided on the front face of the saddle 114. A grinding-wheel head 116 being movable in the Y-axis direction, i.e. a horizontal direction perpendicular to the depth direction of a tooth space of the helical gear 10 on the rotary table 112 is provided on the front face of the turn head 115 with a rail 115a therebetween.

On one side, in the Y-axis direction, of the front face of the grinding-wheel head 116, there is provided a grinding-wheel spindle part 117 having a grinding-wheel shaft 117a with its axis extending along a vertical plane which is parallel to the Y-axis direction. A disk-shaped grinding wheel 118 for profile grinding is attached to the grinding-wheel shaft 117a of the grinding-wheel spindle part 117 coaxially, i.e. with its circumference facing the rotary table 112 side. To the other side, in the Y-axis direction, of the front face of the grinding-wheel head 116, attached is the base end of an arm 119 projecting in such a way that its tip is located closer to the rotary table 112 side than the grinding wheel 118 is. A touch probe 120 being displacement measuring means for detecting displacement of the helical gear 10 in the X-axis direction which is a direction perpendicular to the direction of the axis of the helical gear 10 is attached to the tip of the arm 119.

Figure 3:
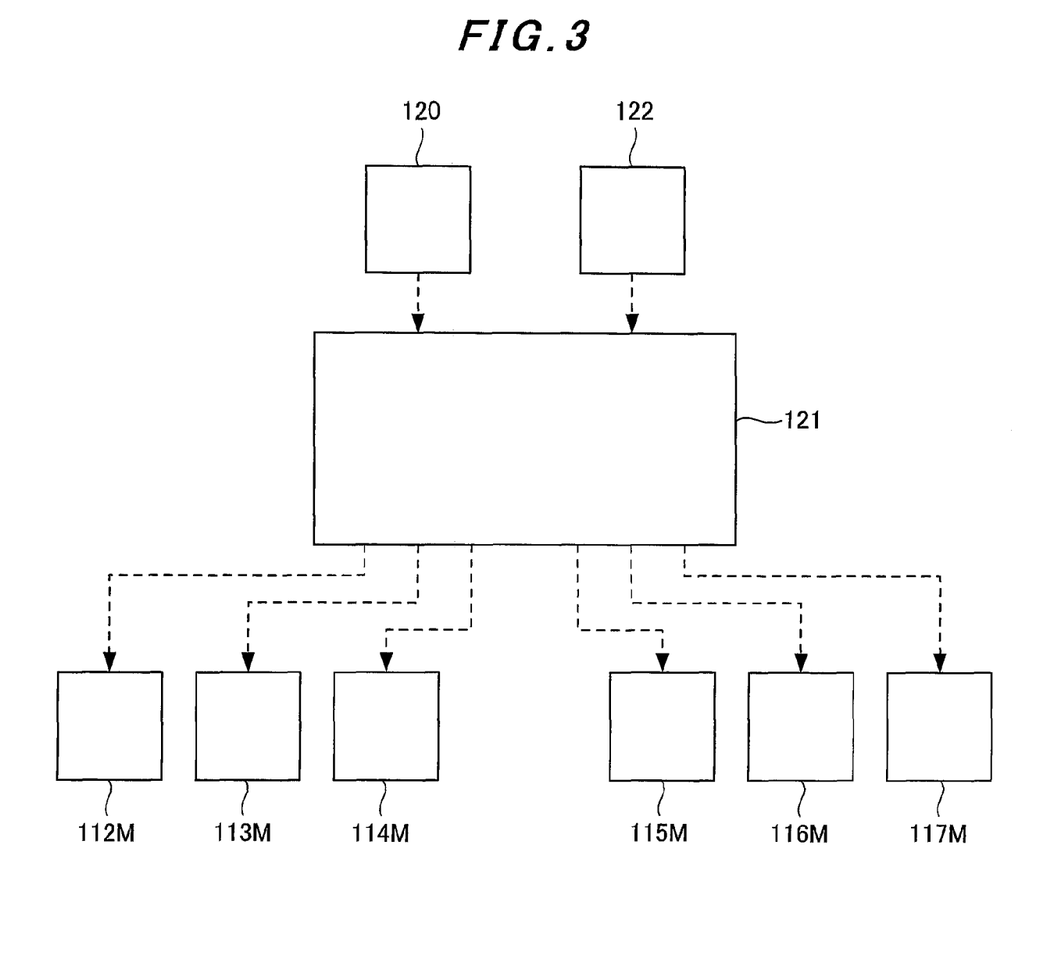
FIG. 3 is a block diagram of a control system of the gear grinding machine in FIG. 1.

As shown in FIG. 3, the touch probe 120 is electrically connected to an input part of a control device 121 being controlling means. An output part of an input unit 122 being inputting means for performing operations including input of various conditions such as the specifications of the helical gear 10 is electrically connected to the input part of the control device 121.

An output part of the control device 121 is electrically connected to: a motor 112M being rotary-table driving means for rotating the rotary table 112 about the Z axis; a motor 113M configured to move the column 113 horizontally in the X-axis direction; a motor 114M configured to move the saddle 114 up and down in the Z-axis direction; a motor 115M configured to turn the turn head 115 about the X axis, i.e. to turn the axis of the grinding wheel 118 along a vertical plane; a motor 116M configured to slidingly move the grinding-wheel head 116 in the Y-axis direction; and a motor 117M configured to rotate the grinding-wheel shaft 117a of the grinding-wheel spindle part 117 about the axis of the spindle rotation. The control device 121 is capable of controlling the actuation of the motors 112M to 117M on the basis of information inputted from the touch probe 120 and the input unit 112, and the like (details will be described later).

Note that in this embodiment, the bed 111, the column 113, the motor 113M, and the like constitute X-axis direction moving means; the saddle 114, the motor 114M, and the like constitute Z-axis direction moving means; the turn head 115, the motor 115M, and the like constitute grinding-wheel turning means; the grinding-wheel head 116, the motor 116M, and the like constitute Y-axis direction moving means; and the grinding-wheel spindle part 117, the motor 117M, and the like constitute grinding-wheel rotating means.

Next, a gear grinding method using the above gear grinding machine 100 according to this embodiment will be described.

First, the helical gear 10 is mounted onto the rotary table 112 as coaxially as possible. In addition to this, various conditions such as the specifications of the helical gear 10 (diameter, width, face width, the number of teeth, helix angle, and the like) are inputted to the input unit 112 (S1 in FIG. 4). In response, the control device 121 actuates the motor 116M to move the touch probe 120 from the other side toward the one side in the Y-axis direction along the rail 115a by means of the grinding-wheel head 116 and the arm 119 so that the touch probe 120 can be located at a center portion, in the Y-axis direction, of the column 113. Then, the control device 121 actuates the motors 113M and 114M to move the column 113 and the saddle 114 along their respective rails 111a and 113a so that the tip of the touch probe 120 can contact the outer circumferential surface of the boss 10a on the upper side of the helical gear 10 in a direction perpendicular to the rotational axis of the rotary table 112 (axis C) (see Part A of FIG. 5).

When the tip of the touch probe 120 contacts the outer circumferential surface of the boss 10a of the helical gear 10, the control device 121 figures out the position of the helical gear 10 in the X-axis direction at the current phase position on the basis of information from the touch probe 120. Then, the control device 121 actuates the motor 113M to slightly move the column 113 backward along the rails 111a so that the tip of the touch probe 120 can momentarily be disengaged from the boss 10a of the helical gear 10. Thereafter, the control device 121 actuates the motor 112M to rotate the rotary table 112 through a predetermined angle (e.g. 45°).

Subsequently, the control device 121 actuates the motor 113M to move the column 113 forward along the rails 111a so that the tip of the touch probe 120 again can contact the outer circumferential surface of the boss 10a of the helical gear 10, and again figures out the position of the helical gear 10 in the X-axis direction at the current phase position. Then, the control device 121 actuates the motor 113M to again move the column 113 backward along the rails 111a so that the tip of the touch probe 120 again can be disengaged from the boss 10a of the helical gear 10. Thereafter, the control device 121 actuates the motor 112M to again rotate the rotary table 112 through the predetermined angle (e.g. 45°).

Subsequently, the actuations described above are repeated given times corresponding to the predetermined angle (e.g. eight times) (see Part C of FIG. 5). As a result, the control device 121 measures the amount of displacement, in the X-axis direction, of the boss 10a on the upper side of the helical gear 10 entirely in the circumferential direction of the helical gear 10 (S2 in FIG. 4). Based on this measurement, the control device 121 calculates the position of the axis of the upper side of the helical gear 10 on the X-Y plane (horizontal plane) in the rotation of the rotary table 112. Specifically, the control device 121 calculates: a distance eu of a line connecting the axis of the rotary table 112 (axis C) and the axis of the upper side of the helical gear 10 in the rotation of the rotary table 112; and an angle Φu of the line connecting the axis of the rotary table 112 (axis C) and the axis of the upper side of the helical gear 10 in the rotation of the rotary table 112, within an X-Y plane (horizontal plane) coordinate system having the axis of the rotary table 112 (axis C) at the center. In other words, the control device 121 calculates a value of eccentricity (value of offset) cu of the upper side of the helical gear 10 with respect to the position of the axis of the rotary table 112 (axis C) on the X-Y plane (horizontal plane) in a state where the rotary table 112 is at a reference phase (S3 in FIG. 4; see Part A of FIG. 6).

Figure 4:
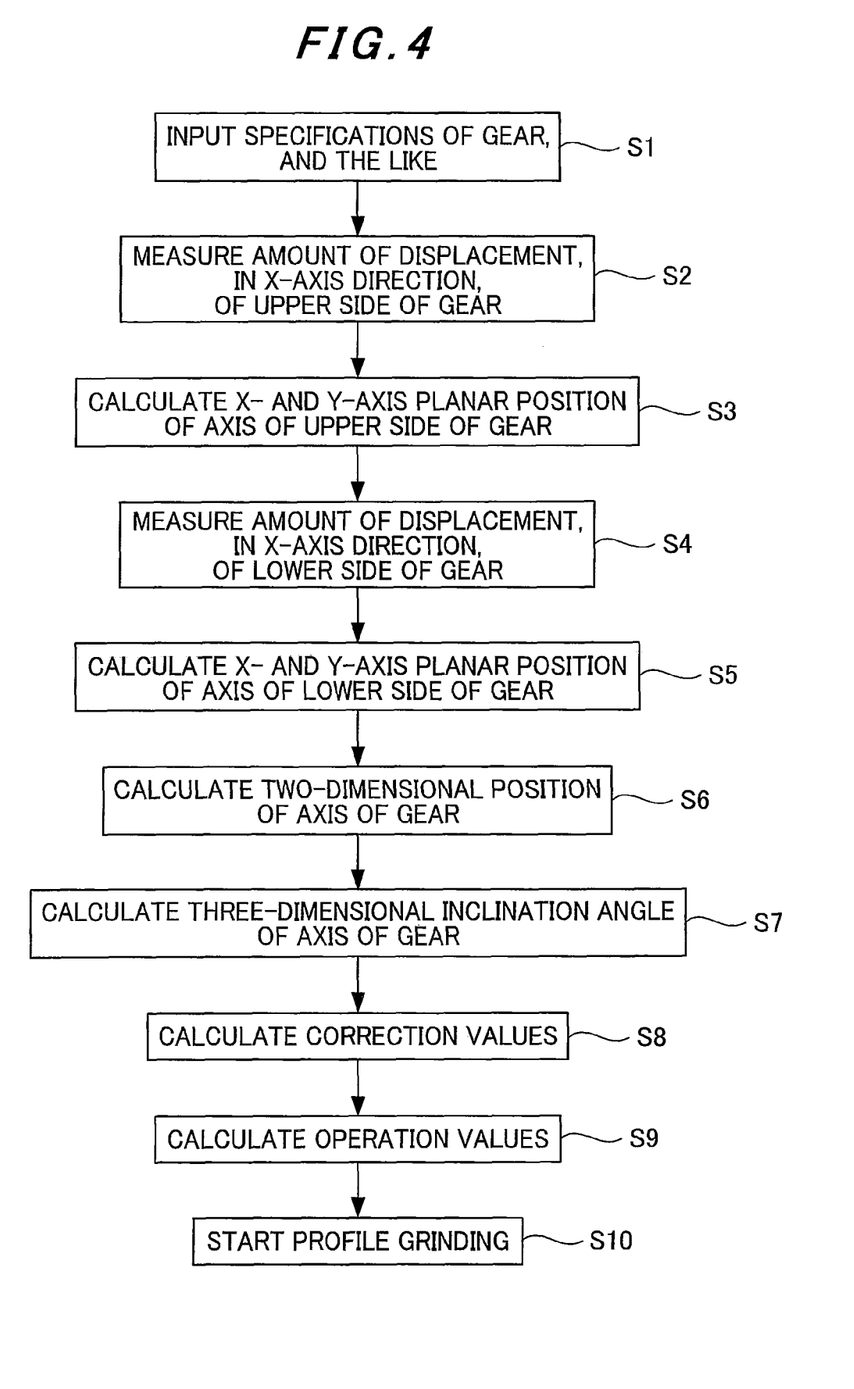
FIG. 4 is a flowchart of the control system of the gear grinding machine in FIG. 1.
Figure 5A:
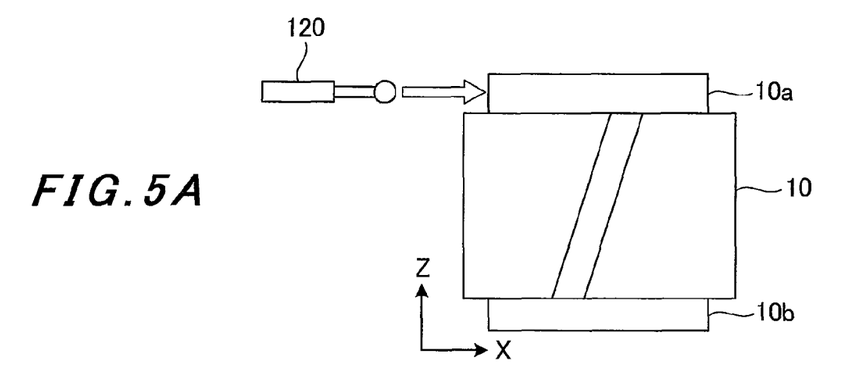
FIG. 5 is a view illustrating a procedure for measuring the amount of displacement of a gear in the gear grinding machine in FIG. 1.
Figure 5B:
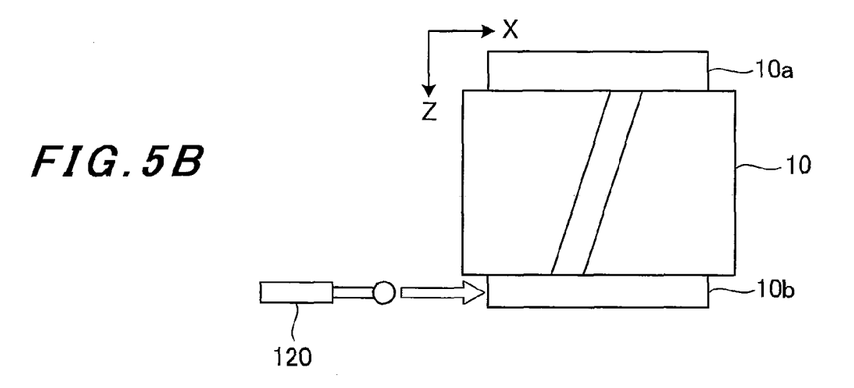
Figure 5C:
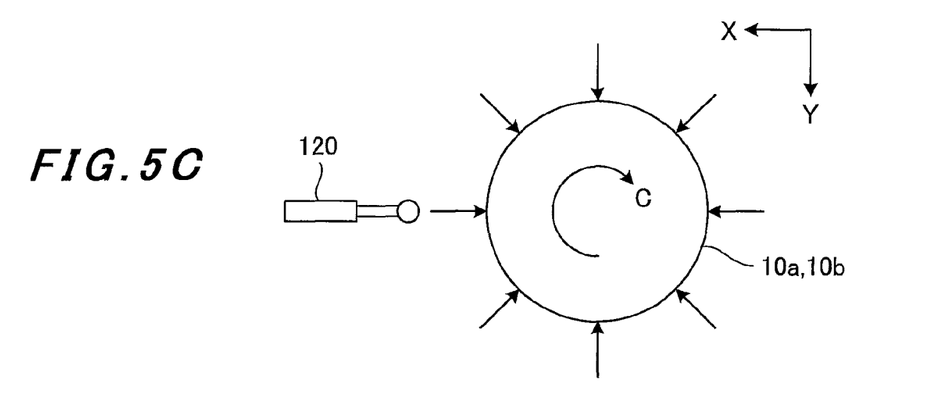
Figure 6A:
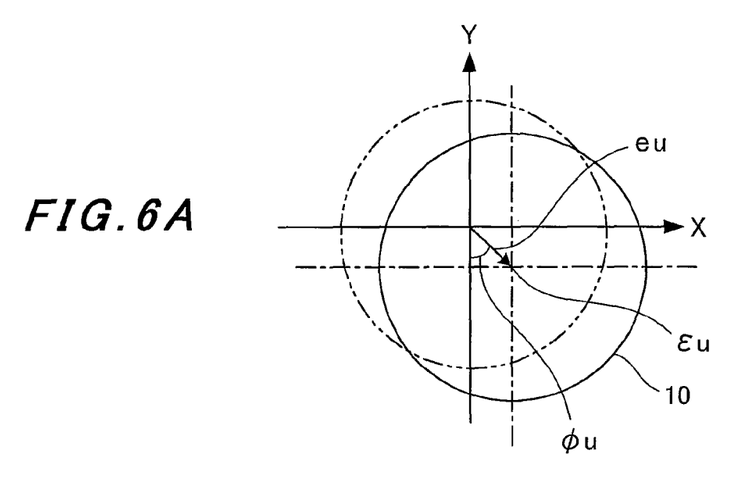
FIG. 6 is a view illustrating various types of values to be calculated by the gear grinding machine in FIG. 1.
Figure 6B:
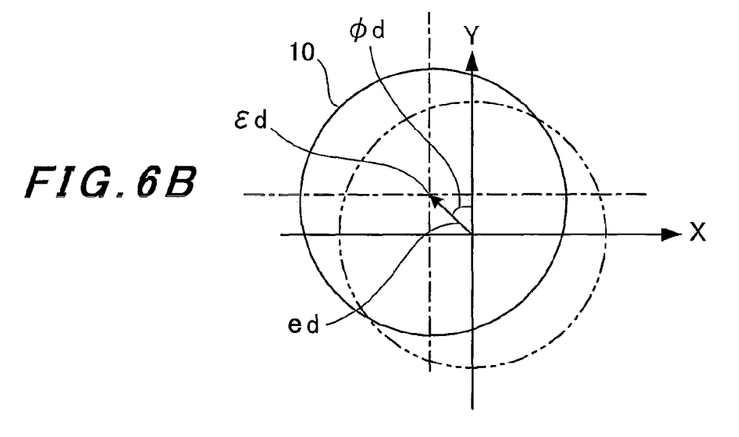
Figure 6C:
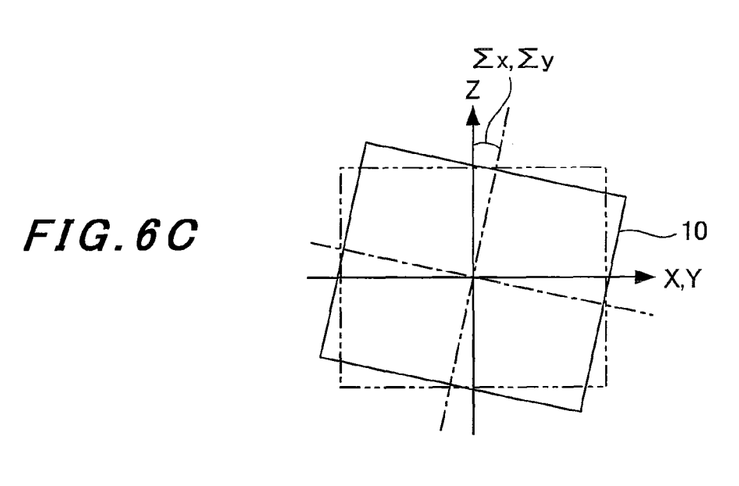

Then, as in the case of the boss 10*a* on the upper side, the control device 121 actuates the motors 113M and 114M to move the column 113 and the saddle 114 along their respective rails 111*a* and 113*a* so that the tip of the touch probe 120 can contact the outer circumferential surface of the boss 10*b* on the lower side of the helical gear 10 (see Part B of FIG. 5). Thereafter, the same actuations as described above are performed. Thereby, the control device 121 measures the amount of displacement, in the X-axis direction, of the lower side of the helical gear 10 entirely in the circumferential direction of the helical gear 10 (S4 in FIG. 4). Based on this measurement, the control device 121 calculates the position of the axis of the lower side of the helical gear 10 on the X-Y plane (horizontal plane) in the rotation of the rotary table 112. Specifically, the control device 121 calculates: a distance ed of a line connecting the axis of the rotary table 112 (axis C) and the axis of the lower side of the helical gear 10 in the rotation of the rotary table 112; and an angle Φd of the line connecting the axis of the rotary table 112 (axis C) and the axis of the lower side of the helical gear 10 in the rotation of the rotary table 112, within the X-Y plane (horizontal plane) coordinate system having the axis of the rotary table 112 (axis C) at the center. In other words, the control device 121 calculates a value of eccentricity (value of offset) εd of the lower side of the helical gear 10 with respect to the position of the axis of the rotary table 112 (axis C) on the X-Y plane (horizontal plane) in the state where the rotary table 112 is at the reference phase (S5 in FIG. 4; see Part B of FIG. 6).

Then, the control device 121 calculates the position of the axis of a center portion, in the axial direction (face width direction), of the helical gear on the X-Y plane (horizontal plane), from the position of the axis of the boss 10*a* on the upper side on the X-Y plane (horizontal plane) and the position of the axis of the boss 10*b* on the lower side on the X-Y plane (horizontal plane). Specifically, the control device 121 calculates a distance em as the mean of the distances eu and ed, an angle Φm as the mean of the angles Φu and Φd, and a value of eccentricity (value of offset) εm in a two dimensional space as the mean of the values of eccentricity εu and εd (S6 in FIG. 4). In addition, the control device 121 calculates the angles of inclination of the axis of the helical gear 10 with respect to the axis of the rotary table 112 (axis C) on vertical planes (a three dimensional space) in the state where the rotary table 112 is at the reference phase; to be specific, the control device 121 calculates an angle of inclination Σx of the X-axis direction component and an angle of inclination Σy of the Y-axis direction component with respect to the Z axis (axis C) (S7 in FIG. 4; see Part C of FIG. 6). As a result, the control device 121 calculates the actual position of the axis of the helical gear 10 with respect to the position of the axis of the rotary table 112 (axis C).

After calculating the actual position of the axis of the helical gear 10 as described above, that is, after calculating the value of eccentricity (value of offset) εm of the helical gear 10 in the two dimensional space and the angles of inclination Σx and Σy in the three dimensional space, the control device 121 calculates correction values for the position and motion of the rotary table 112 and correction values for the position and motion of the grinding wheel 118 on the basis of the value of eccentricity (value of offset) εm and the angles of inclination Σx and Σy (S8 in FIG. 4). In profile grinding, the correction values cancel out the differences, caused by the actual position of the axis of the helical gear 10, from reference values of the position and motion of the rotary table 112 in profile grinding performed in a condition where the axis of the helical gear 10 coincides with the axis of the rotary table 112 (axis C), and reference values of the position and motion of the grinding wheel 118 corresponding to the rotational phase of the rotary table 112 in the above-described condition.

Specifically, based on the value of eccentricity (value of offset) εm, the control device 121 calculates (1) correction values for the X- and Y-axis (horizontal) position (two dimensional position) of the profile-grinding start point, the position being influenced by the offset of the axis of the helical gear and (2) correction values for an X- and Y-axis (horizontal) motion (two dimensional motion) associated with a motion in the Z-axis direction unique in the profile grinding (two dimensional eccentricity correction values). Further, based on the angles of inclination Σx and Σy, the control device 121 calculates (3) correction values for displacement of positions in the Z-axis direction (vertical direction) and about the axis C (on the horizontal plane) (three dimensional positions) caused by the inclination of the axis of the helical gear 10, (4) correction values for displacement of a motion in the X- and Y-axis (horizontal) directions (three dimensional position) associated with a motion in the Z-axis direction (vertical direction) (three dimensional motion) in the profile grinding operation, the motion in the Z-axis direction being influenced by the inclination of the axis of the helical gear 10, and (5) correction values for motions in the X- and Y-axis directions and about the axis C (on the horizontal plane) (three dimensional motions) associated with a motion in the Z-axis direction (vertical direction) (three dimensional motion), the correction values correcting tooth profile errors caused by displacement of the tooth-profile grinding line of the grinding wheel 118 on the tooth surface of the helical gear 10 due to the influence of the inclination of the axis of the helical gear 10 (three dimensional eccentricity correction values).

Meanwhile, along with the calculation of the above correction values of the helical gear 10, the control device 121 actuates the motor 113M to momentarily retreat the column 113, and then causes the touch probe 120 to be located on the other side, in the Y-axis direction, of the column 113, that is, actuates the motor 116M to move the touch probe 120 from the one side toward the other side in the Y-axis direction along the rail 115*a* by means of the grinding-wheel head 116 and the arm 119 so that the grinding wheel 118 can be located on the center portion, in the Y-axis direction, of the column 113. As a result, the touch probe 120 is moved to a retreat position, and the grinding wheel 118 is located at an operation start position.

Then, after calculating the correction values, the control device 121 adds the correction values to the reference values to calculate the actual operation values of the position and motion of the rotary table 112 and also to calculate the actual operation values for the position and motion of each of the column 113, the saddle 114, and the grinding-wheel head 116 corresponding to the rotational phase of the rotary table 112 (S9 in FIG. 4). Then, the control device 121 performs the profile grinding of the helical gear 10 with the grinding wheel 118 by controlling the motors 115M and 117M to actuate the turn head 115 and the grinding wheel 118 in accordance with the reference values mentioned above, and also by controlling the motors 112M to 114M and 116M to actuate the rotary table 112, the column 113, the saddle 114, the turn head 115, and the grinding-wheel head 116 in accordance with the operation values mentioned above (S10 in FIG. 4).

Figure 7:
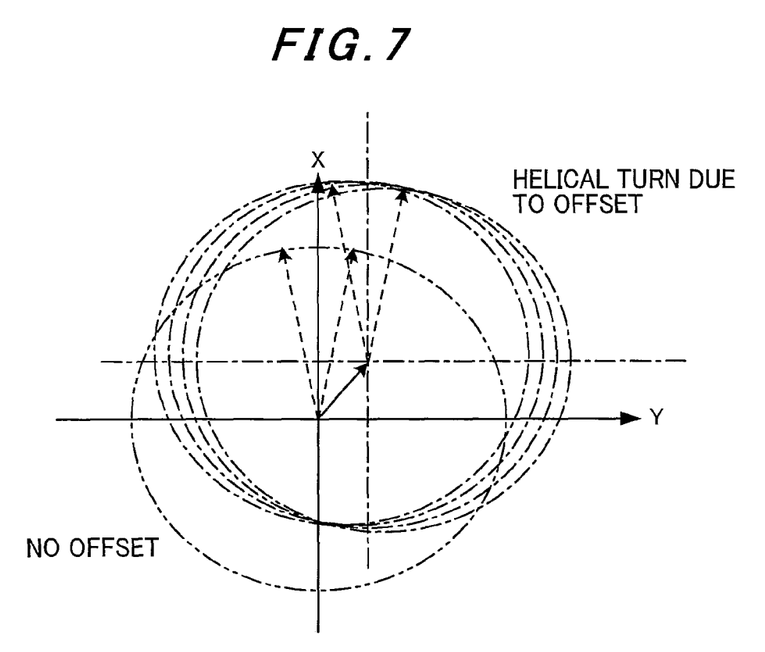
FIG. 7 is a view illustrating the path of the outer circumference of the gear turning with the axis of the gear being offset with respect to the axis of a rotary table.

Specifically, as shown in FIG. 7, when the axis of the helical gear 10 is eccentric (offset) with respect to the axis of the rotary table 112 (axis C), the coordinates of the position of the profile-grinding start point change from one tooth space of the helical gear 10 to another tooth space indexed. Accordingly, the grinding start point moves in a fluctuating manner. Thus, for each tooth space of the helical gear 10 indexed, the X- and Y-axis (horizontal) position of the grinding wheel 118 and the Z-axis (vertical) position thereof are corrected so as to follow the fluctuations. Moreover, the axis of the helical gear 10 moves from one tooth space of the helical gear 10 to another tooth space indexed, in synchronization with the phase of the rotary table 112. Accordingly, the profile-grinding point moves in such a way as to swing (helical turn) between one and the other sides in the face width direction, i.e. between upper and lower sides. Thus, along with the motion of the grinding wheel 118 in the Z-axis direction (vertical direction), the X- and Y-axis (horizontal) motion of the grinding wheel 118 is corrected in such a way as to follow the swinging grinding point.

Figure 8A:
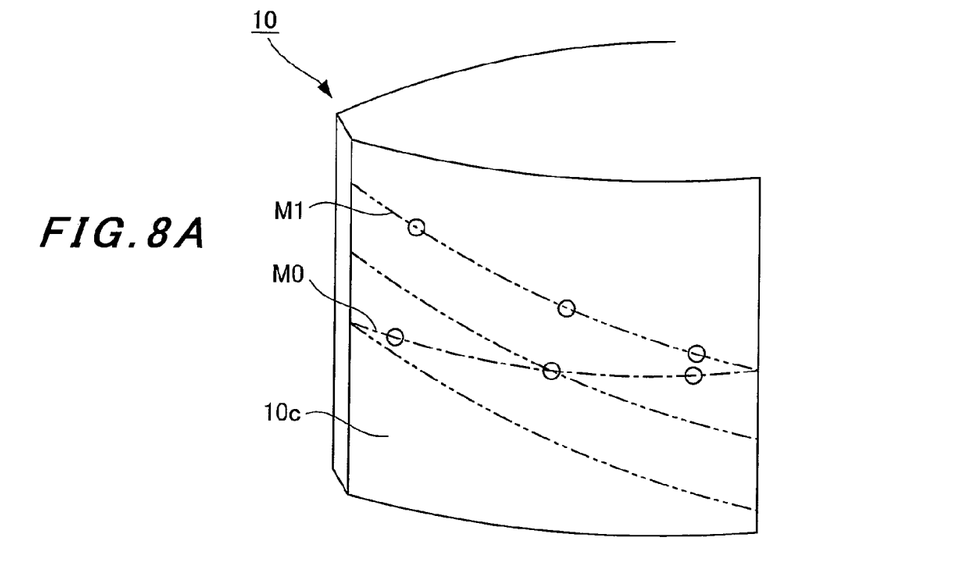
FIG. 8 is a view illustrating how profile grinding is done on the tooth surface of the gear in a state where the axis of the gear is inclined with respect to the axis of the rotary table.
Figure 8B:
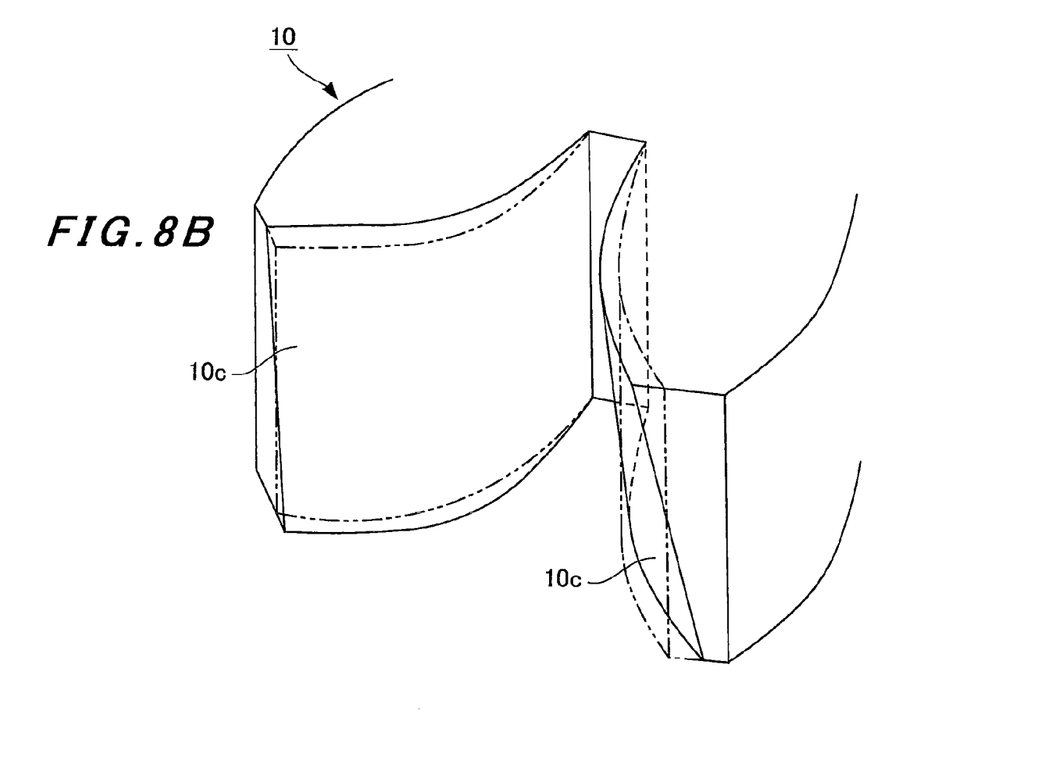

In addition, when the axis of the gear 10 is inclined with respect to the axis of the rotary table 112 (axis C), a tooth-profile grinding line M1 of the grinding wheel 118 on a tooth surface 10c of the helical gear 10 is displaced from a reference tooth-profile grinding line M0 as shown in Part A of FIG. 8. Accordingly, the contact between the grinding wheel 118 and the tooth surface 10c fails to be in a prescribed state. As shown in Part B of FIG. 8, this results in an error in the tooth surface 10c of the helical gear 10 after its profile grinding. Thus, based on the angles of inclination of the axis of the helical gear 10 with respect to the axis of the rotary table 112 (axis C), the motion of the grinding wheel 118 in the X- and Y-axis (horizontal) directions and the rotational (horizontal) motion of the rotary table 112 about the axis C are further corrected in association with the motion of the grinding wheel 118 in the Z-axis direction (vertical direction) in such a way as to cancel out the error in the tooth surface 10c.

Accordingly, with the present invention, it is possible to perform accurate profile grinding of the helical gear 10 with the grinding wheel 118 for profile grinding, even when the axis of the helical gear 10 is displaced with respect to the axis of the rotary table 112 (axis C).

<Other Embodiments>

Note that while the foregoing embodiment has described a case of performing profile grinding of a large-sized helical gear 10, the present invention is not limited to this case and can be applied to a case of performing profile grinding of a small-sized helical gear. However, the operations and effects of the gear grinding machine and the gear grinding method according to the present invention can be demonstrated fully in a case of performing profile grinding of a large-sized gear having helical tooth traces like the foregoing embodiment.

Moreover, while the foregoing embodiment has described a case of performing profile grinding of the helical gear 10, the present invention is not limited to this case and can be applied to a case of performing profile grinding of a gear having helical tooth traces such as a crossed helical gear in a similar manner to the foregoing embodiment.

INDUSTRIAL APPLICABILITY

The gear grinding machine and the gear grinding method according to the present invention can be utilized remarkably effectively in metal working industries and the like for being capable of performing accurate profile grinding of a large-sized gear having helical tooth traces with a grinding wheel for profile grinding, even when the axis of the gear is displaced with respect to the axis of a rotary table.

REFERENCE SIGNS LIST 10 helical gear
10a, 10b boss
10c tooth surface
100 gear grinding machine
111 bed
111a rail
112 rotary table
112M motor
113 column
113a rail
113M motor
114 saddle
114M motor
115 turn head
115a rail
115M motor
116 grinding-wheel head
116M motor
117 grinding-wheel spindle part
117a grinding-wheel shaft
117M motor
118 grinding wheel
119 arm
120 touch probe
121 control device
122 input unit

The invention claimed is:

1. A gear grinding machine for performing profile grinding of a gear with a disk-shaped grinding wheel, the gear having a helical tooth trace and mounted on a rotary table with an axis thereof oriented in a vertical direction, comprising:
   rotary-table driving means for rotating the rotary table about an axis extending in the vertical direction;
   grinding-wheel rotating means for rotating the grinding wheel with a circumference of the grinding wheel facing the gear on the rotary table;
   displacement measuring means for measuring displacement of the gear on the rotary table in a direction perpendicular to a direction of the axis of the gear;
   X-axis direction moving means for moving the grinding wheel and the displacement measuring means in a depth direction of a tooth space of the gear on the rotary table;
   Y-axis direction moving means for moving the grinding wheel and the displacement measuring means in a horizontal direction perpendicular to the depth direction of the tooth space of the gear on the rotary table;
   Z-axis direction moving means for moving the grinding wheel and the displacement measuring means in the vertical direction; and
   controlling means for
      actuating the rotary-table driving means and the axis direction moving means in such a way that the displacement measuring means measures a position of a circumference of the gear on the rotary table in the direction perpendicular to the direction of the axis of the gear, at a plurality of points in a circumferential direction and an axial direction of the gear, calculating an actual position of the axis of the gear with respect to a position of an axis of the rotary table on the basis of information from the displacement measuring means;

calculating correction values for a position and motion of each of the rotary table and the grinding wheel on the basis of the actual position of the axis of the gear, the correction values, in the profile grinding, cancelling out differences, caused by the actual position of the axis of the gear, from reference values of a position and motion of the rotary table in the profile grinding performed in a condition where the axis of the gear coincides with the axis of the rotary table and reference values of a position and motion of the grinding wheel corresponding to a rotational phase of the rotary table in the condition;

adding the correction values to the reference values to calculate operation values of the rotary-table driving means and operation values of the X-axis direction moving means, the Y-axis direction moving means, and the Z-axis direction moving means corresponding to the rotational phase of the rotary table; and controlling the rotary-table driving means, the X-axis direction moving means, the Y-axis direction moving means, and the Z-axis direction moving means in such a way as to actuate the rotary-table driving means, the X-axis direction moving means, the Y-axis direction moving means, and the Z-axis direction moving means in accordance with the operation values, to perform the profile grinding of the gear with the grinding wheel, wherein the controlling means calculates the actual position of the axis of the gear with. respect to the position of the axis of the rotary table by calculating, on the basis of the information information from the displacement measuring means, a value of eccentricity $\epsilon u$ of an upper side of the gear with respect to the position of the axis of the roar table on a horizontal plane in a state where the rotary table is at reference phase, and a value of eccentricity $\epsilon d$ of a lower side of the gear with respect to the position. he a f the rotary table on the horizontal plane in the state where the rotary table is at the reference phase, and calculating, on the basis of the values of eccentricity $\epsilon u$ and $\epsilon d$, a value of eccentricity $cm$ of a center portion, in the axial direction, of the gear with respect to the position of the axis of the rotary table on the horizontal plane in the state where the rotary table is at the reference phase, and angles of inclination $\Sigma x$ and $\Sigma v$ of the axis of the ear with respect to the axis of the rotary table on vertical planes in the state where the rotary table is at the reference phase, wherein on the basis of the value of eccentricity $\epsilon m$, the controlling means calculates correction values for a horizontal position of a profile-grinding start point, the horizontal position. being influenced by offset of the axis of the gear. and correction values for a horizontal motion associated with a motion in a Z-axis direction in the profile grinding, and on the basis of the angles of inclination $\Sigma x$ and $\Sigma y$, the controlling means calculates a correction value for displacement of a position in the vertical direction caused by the inclination of the axis of the gear, correction values for displacement of a motion in the horizontal directions associated with a motion in the vertical direction in the profile grinding operation, the motion in the vertical direction being influenced by the inclination of the axis of the gear, and correction values for a motion in the horizontal directions associated with a motion in the vertical direction, the correction values correcting a tooth profile error caused by displacement of a tooth-profile grinding line of the grinding wheel on a tooth surface of the gear due to the influence of the inclination of the axis of the gear.

* * * * *